United States Patent
Kasahara et al.

(10) Patent No.: US 7,210,103 B2
(45) Date of Patent: Apr. 24, 2007

(54) PRINTED BOOK PUBLISHING SYSTEM AND MANAGEMENT METHOD FOR PRINTED BOOK PUBLISHING

(75) Inventors: Seitarou Kasahara, Hachioji (JP); Mitsuo Motohashi, Hachioji (JP); Akira Kinoshita, Hino (JP); Akitoshi Matsubara, Hachioji (JP); Masahiko Kamei, Kodaira (JP); Yuichi Atarashi, Hachoji (JP); Xiang Hong Guan, Tokyo (JP); Alex Xuyang Li, Tokyo (JP); Keizo Kawada, Tokyo (JP); Michiyo Shimonaka, Tokyo (JP)

(73) Assignee: Konica Corporation (JP)

( * ) Notice: Subject to any disclaimer, the term of this patent is extended or adjusted under 35 U.S.C. 154(b) by 686 days.

(21) Appl. No.: 10/165,516

(22) Filed: Jun. 7, 2002

(65) Prior Publication Data

US 2004/0205636 A1 Oct. 14, 2004

(30) Foreign Application Priority Data

Jun. 15, 2001 (JP) ............................. 2001-181185

(51) Int. Cl.
*G06F 17/21* (2006.01)
*G06F 17/24* (2006.01)
*G06F 15/16* (2006.01)

(52) U.S. Cl. ...................... 715/526; 715/513; 709/203; 705/52

(58) Field of Classification Search ............... 715/526, 715/520, 525, 527; 705/40, 29; 709/201, 709/202, 203, 217, 219; 358/1.15
See application file for complete search history.

(56) References Cited

U.S. PATENT DOCUMENTS

| 5,289,569 | A | * | 2/1994 | Taniguchi | ................... 715/525 |
| 5,465,213 | A | | 11/1995 | Ross | ......................... 700/107 |
| 5,509,074 | A | | 4/1996 | Choudhury et al. | .......... 380/23 |
| 5,532,920 | A | | 7/1996 | Hartrick et al. | .......... 364/419.1 |
| 6,012,890 | A | | 1/2000 | Celorio Garrido | ........... 412/19 |
| 6,078,936 | A | * | 6/2000 | Martin et al. | ................ 715/527 |
| 6,134,568 | A | | 10/2000 | Tonkin | ....................... 715/526 |

(Continued)

FOREIGN PATENT DOCUMENTS

EP 1 098 266 A2 5/2001

(Continued)

OTHER PUBLICATIONS

Daniel Munyan, "Everybook Inc.: Developing the E-Book in Relation To Publishing Standards", President and Founder Everybook, Inc., Sep. 1998, pp. 1-7.*

(Continued)

*Primary Examiner*—William Bashore
*Assistant Examiner*—Maikhanh Nguyen
(74) *Attorney, Agent, or Firm*—Cantor Colburn LLP

(57) ABSTRACT

Printed book publishing system and method, for loading down data on a network according to a request from a terminal and for outputting the loaded data for publishing the printed book, comprising a management server which performs making a data server storing book contents data send the book contents data according to a request from the terminal; wherein the book contents data is converted to image data for viewing and the image data for viewing is sent to the terminal.

7 Claims, 11 Drawing Sheets

U.S. PATENT DOCUMENTS

| | | | |
|---|---|---|---|
| 6,246,993 B1 * | 6/2001 | Dreyer et al. | 705/9 |
| 6,501,472 B1 * | 12/2002 | Hunt et al. | 345/428 |
| 6,615,234 B1 * | 9/2003 | Adamske et al. | 709/203 |
| 6,661,530 B1 * | 12/2003 | Munetomo et al. | 358/1.15 |
| 6,792,485 B2 * | 9/2004 | Aoki et al. | 710/65 |
| 6,857,796 B2 * | 2/2005 | Hatayama | 400/61 |
| 6,891,953 B1 * | 5/2005 | DeMello et al. | 380/277 |
| 6,950,101 B2 * | 9/2005 | Hunt et al. | 345/428 |
| 7,124,094 B1 * | 10/2006 | Kobayashi et al. | 705/26 |
| 2002/0018221 A1 * | 2/2002 | Senay et al. | 358/1.1 |
| 2002/0062397 A1 * | 5/2002 | Chang et al. | 709/246 |
| 2002/0062398 A1 * | 5/2002 | Chang et al. | 709/246 |
| 2002/0077980 A1 * | 6/2002 | Chang et al. | 705/40 |
| 2002/0078101 A1 * | 6/2002 | Chang et al. | 707/523 |
| 2002/0078149 A1 * | 6/2002 | Chang et al. | 709/203 |
| 2002/0156740 A1 * | 10/2002 | Kasahara et al. | 705/52 |
| 2003/0072299 A1 * | 4/2003 | Hunt et al. | 370/352 |
| 2004/0068471 A1 * | 4/2004 | Kato | 705/51 |
| 2004/0205636 A1 * | 10/2004 | Kasahara et al. | 715/526 |

FOREIGN PATENT DOCUMENTS

| | | |
|---|---|---|
| WO | WO 99/63452 | 12/1999 |
| WO | WO 00/72460 A1 | 11/2000 |

OTHER PUBLICATIONS

McAllister et al., "The Impact of Digital Books upon Printing Publishing", C & M Online Media, Inc.,IEEE, Jun. 2002, pp. 150-154.*

Harrison et al., "E-Books and the Future of Reading", Computer Graphics and Applications, IEEE, May/Jun. 2000, pp. 32-39.*

A. Ryman, "Personal systems image application architecture: Lessons learned from the ImagEdit program", IBM System Journal, vol. 29, No. 3, 1990, pp. 408-420.*

R. Vetter, "Mosaic and the World-Wide Web", IEEE Computing Practices, Oct. 1994, pp. 49-57.*

"Book Management for Demographic Bindery Control System", IBM Technical Disclosure Bulletin, vol. 36, No. 9B, pp. 1-2, Sep. 1993.*

A. Mooij et al., "VarDaP Project: User Requirements Documents," XP-002378374, Jan. 19, 2000, pp. 1-13.*

C. House et al., "An On-Line Communication Print Service for the Demanding Client," ACM, Nov. 1993, pp. 135-139.*

* cited by examiner

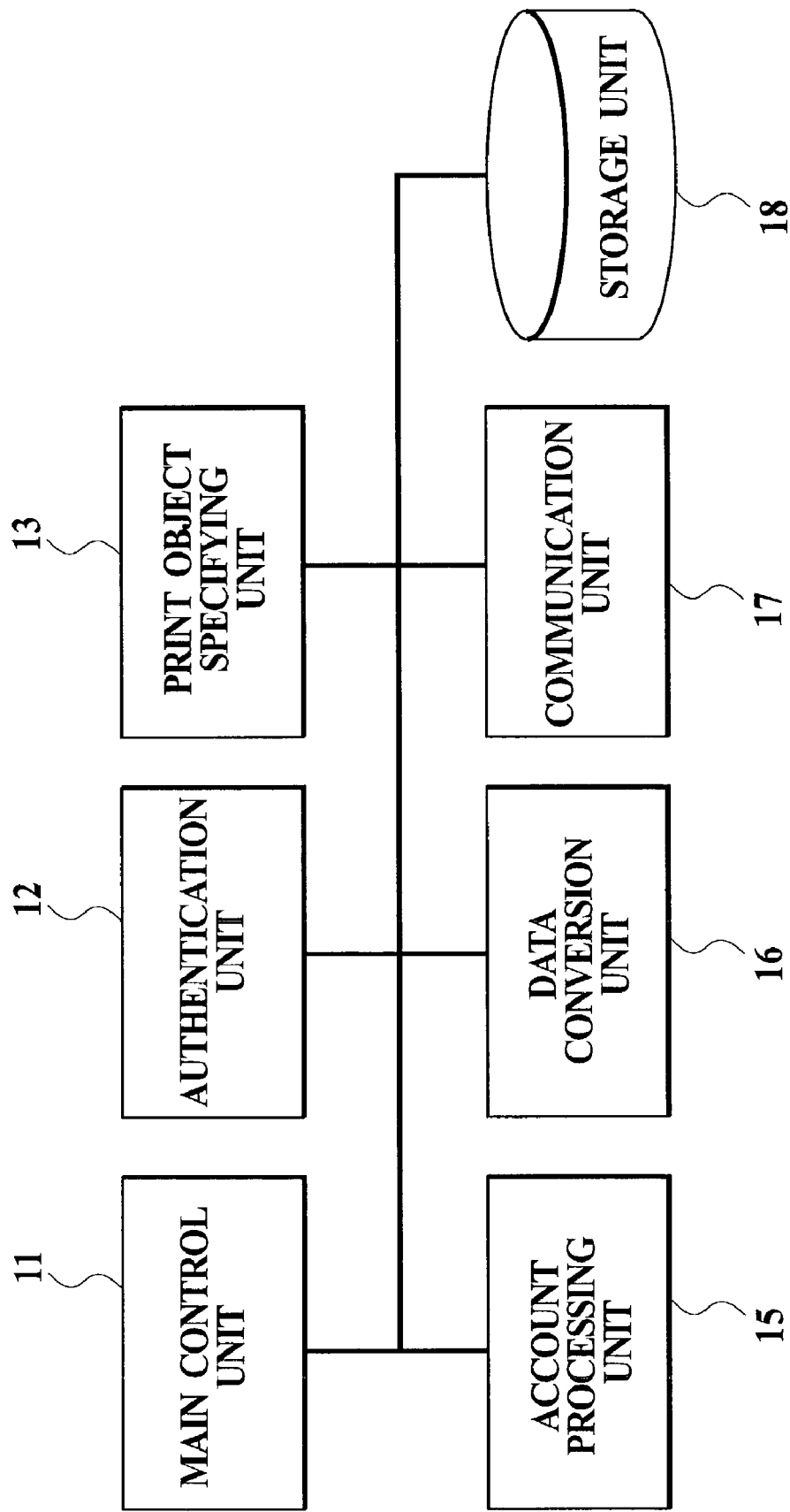

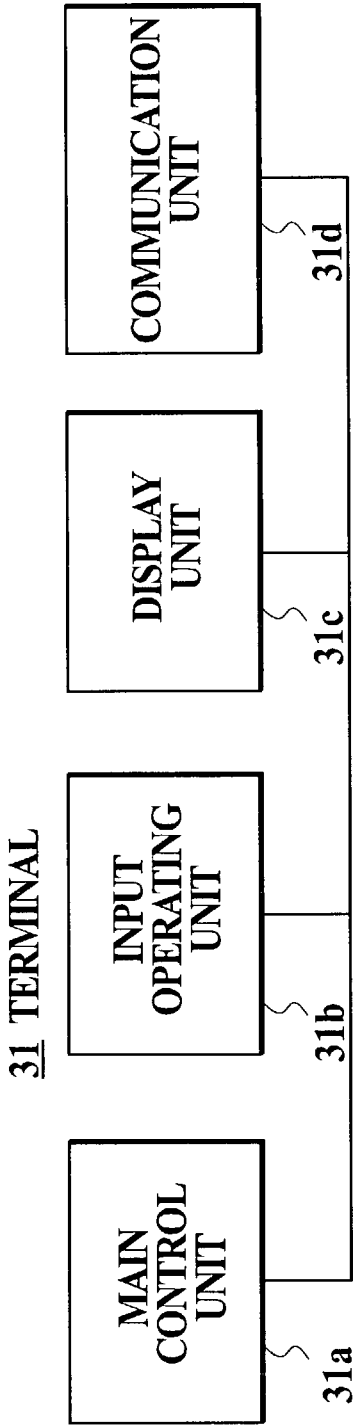
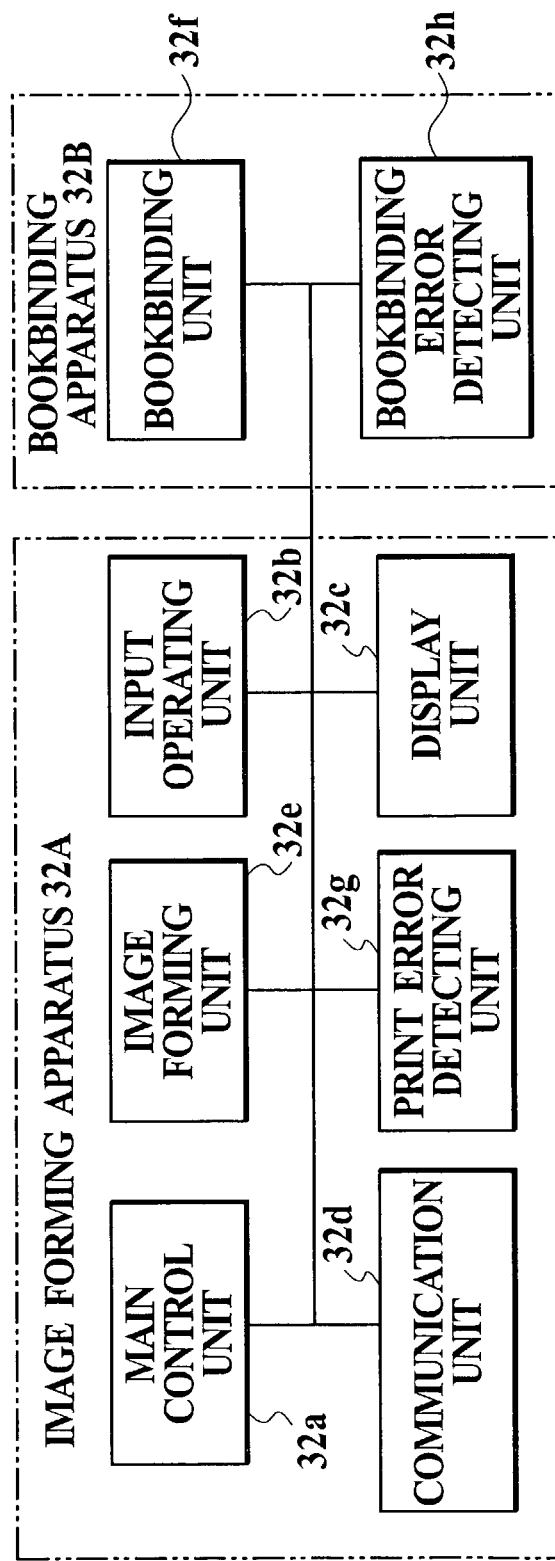

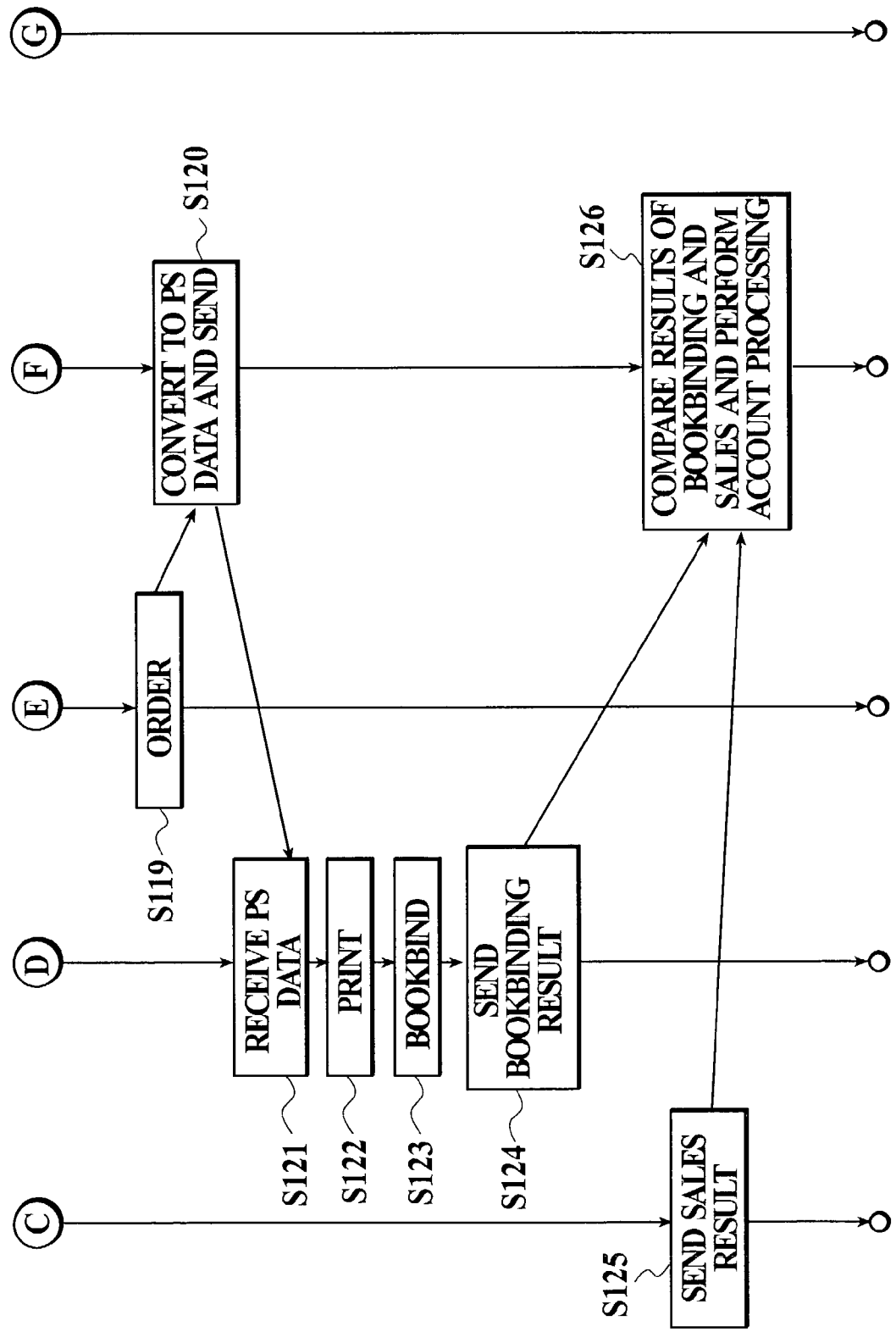

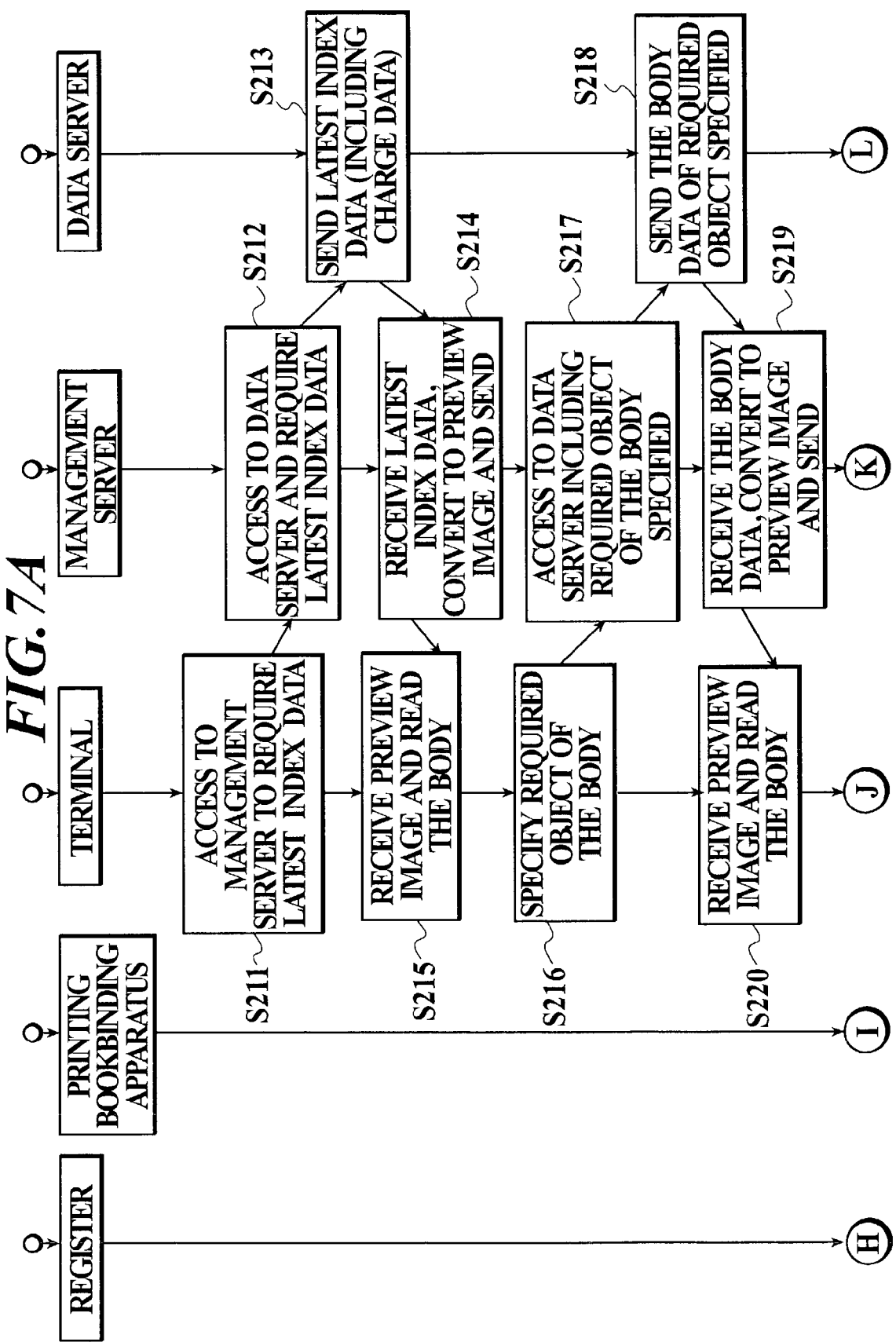

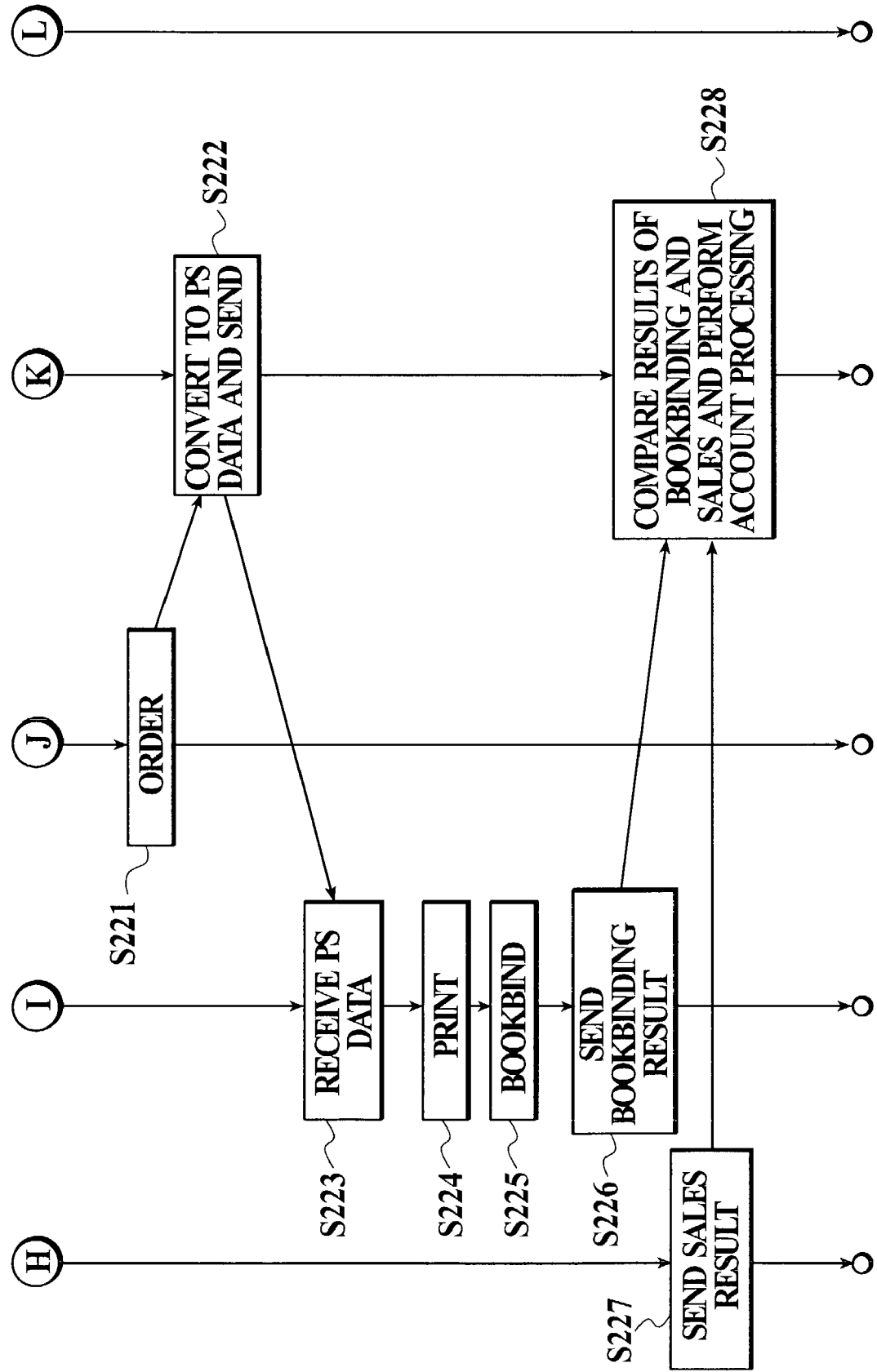

PRINTED BOOK PUBLISHING SYSTEM AND MANAGEMENT METHOD FOR PRINTED BOOK PUBLISHING

BACKGROUND OF THE INVENTION

1. Field of the Invention

The present invention relates to a system and a method, for managing printed book publishing, in which data of book contents are loaded down from a server and printing and bookbinding for them are performed in a terminal side through an internet, according to a user's request from a terminal.

2. Description of Related Art

At present, there is a desire for providing published materials to users by loading digital data for a book or the like down from a server which is connected to an internet and thereafter by printing, as a form of electronic publication. On the contrary, there is also a tendency to suppress provision of digital data for published materials which may be expected to have an income of royalty for copyright because the providers for such digital data are concerned about the possibility of unlimited illegal copying.

Here, digital data for a book or the like include various types of writings, e.g., literary works, scientific essays, dictionaries, magazines, photographs, paintings and the like. Further, digital data also include data of a publication whose main elements are not writings, e.g., a collection of photographs, a book of paintings, an atlas and the like.

Japanese Patent Publication (Laid-Open) No. Tokukai-hei 7-239828 which corresponds to U.S. Pat. No. 5,509,074 discloses a technique comprising the steps of: creating encoded documents by using a document server, the encoded documents being able to be decrypted only by users which were authenticated with a copyright server; forwarding the documents to corresponding printing agents of each authenticated request user through a network; and decrypting the documents at each of the agents to print them.

The publication says that the technique can prevent illicit copying of electronically published documents.

Japanese Patent Publication (Laid-Open) No. Tokukai-hei 6-103286 which corresponds to U.S. Pat. No. 5,532,920 discloses a technique in which if a user enters a command to transmit a copy of a book over a modem, the royalty payment program intercepts the copying command and suspends the copying operations, and the royalty payment program presents the user with a display of the royalty payment information stored in the book text or in a file accompanying the book.

The publication says that according to the technique, authors and publishers of softcopy books can protect the copyright for the document simply and securely, by providing a means to enforce the payment of royalties to publishers and authors of softcopy books, when a reader desires to make a copy of a portion or all of the book.

In conventional billing (account) processes for printing in electronic publication, a billing system in which charges for printing are accumulated every success page and the amount according to the accumulated results is billed, has been adopted.

The above-described techniques of the references may enable inhibiting unlimited copying and obtaining royalty. However, these techniques do not take into consideration the possibility of performing collection of royalty at all in the case that the user can obtain digital data for desired electronic publication at the terminal which is operated by the user but cannot obtain the objective publication. Therefore, these references disclose no techniques to solve the problem.

The techniques do not take into consideration the possibility of increasing the process load of each component when digital data are sent and received without regard for the performance of terminals and servers, or the traffic of network.

SUMMARY OF THE INVENTION

The present invention has been developed to resolve the above-described problem. It is therefore an object of the invention to provide a system and a method, for managing printed book publishing, which enables users to obtain desired electronic publications quickly and surely with paying a fair compensation.

It is another object of the invention to provide a system and a method for managing printed book publishing, which enables billing fairly on the basis of the results of bookbinding. The reason for this is that the business does not pay in case that a user fails to perform bookbinding even if succeeded in printing, because of the characteristics of a book.

In accordance with a first aspect of the invention, the printed book publishing system for loading down data on a network according to a request from a terminal and for outputting the loaded data for publishing the printed book, comprises a management server which performs making a data server storing book contents data send the book contents data according to a request from the terminal; wherein the book contents data is converted to image data for viewing and the image data for viewing is sent to the terminal.

Preferably, in the system according to the first aspect of the invention, the management server makes the terminal display the image data for viewing.

Preferably, in the system, the terminal comprises an operating unit and a display unit. The terminal may display the image data for viewing on the display unit.

According to the above-described printed book publishing system, before printing and bookbinding for the book contents data are carried out, the management server makes a data server send the book contents data to the management server in accordance with a request from the terminal, and converts the received book contents data to image data for viewing, and send the converted image data for viewing to the terminal, to make the terminal display the image data for viewing.

Accordingly, a user can confirm an electronic publication by viewing before printing and therefore can obtain the desired correct publication surely.

Preferably, in the system, the management server converts the book contents data to data for printing, and sends the converted data for printing to an image forming apparatus (or a printing bookbinding apparatus).

In the system, it is preferable that the management server converts the book contents data to data for printing which are in place in a predetermined paper size.

Preferably, in the system according to the first aspect of the server sends the data for printing to an image forming apparatus (or a printing bookbinding apparatus) to form an image (or to perform printing and bookbinding).

In the above-described printed book publishing system, in order to make a predetermined number of books, the management server converts the book contents data to data for printing which are in place in a predetermined paper size, in accordance with a request from the terminal, and then sends the data for printing to an image forming apparatus (or a printing bookbinding apparatus), to form an image (or to perform printing and bookbinding) for the data for printing.

Accordingly, users can obtain desired electronic publications securely without enhancing the performance of terminals or servers, nor increasing the process load of each component of network and the like.

Preferably, in the system, the image forming apparatus (or the printing bookbinding apparatus) forms an image (or performs printing and bookbinding) on the basis of the data for printing, not image data for viewing.

In the system, preferably, the management server converts the book contents data to data for printing so that a data format of the image data for viewing which are sent to the terminal is different from that of the data for printing which are sent to the image forming apparatus (or the printing bookbinding apparatus).

In the system, preferably, the book contents data include at least text data, and the image data for viewing have a data format which allows the terminal to display the image data without converting the data format of the terminal, and the data for printing have a data format which allows the image forming apparatus (or the printing bookbinding apparatus) to form an image (or to perform printing and bookbinding).

Preferably, in the system, the management server performs: obtaining the book contents data from the data server in response to a viewing request from the terminal, converting the obtained book contents data to image data for viewing, and then sending the image data for viewing to the terminal; and converting the book contents data to data for printing in response to a printing request from the terminal, and sending data for printing to the image forming apparatus (or the printing bookbinding apparatus).

Preferably, in the system, the data for printing have a data format of PDF or PostScript. The terminal and the image forming apparatus (or the printing bookbinding apparatus) are preferably installed in a store.

In the system, preferably, the terminal is installed in a store; and the management server performs: converting the book contents data corresponding to a book which is requested for viewing from the terminal, to image data for viewing, and then sending the image data for viewing to the terminal, to make the terminal display the image data for viewing; converting the book contents data corresponding to a book which is requested for printing from the terminal, to data for printing, and then sending the data for printing to a printing bookbinding apparatus which includes an image forming apparatus, to make the printing bookbinding apparatus print the data for printing and perform bookbinding; and account processing according to results of book printing and bookbinding by the printing bookbinding apparatus. Preferably, the store is a bookstore.

In the above-described printed book publishing system, the management server converts the book contents data to data for printing which are in place in a predetermined paper size, and then makes the image forming apparatus form an image. When making a predetermined number of books, the management server makes the data server send the book contents data in accordance with a viewing request from the terminal, and converts the received book contents data to image data for viewing, and send the converted image data for viewing to the terminal, to make the terminal display the image data for viewing. According to a printing request from the terminal, the management server converts the book contents data to data for printing, and sends the converted data for printing to the image forming apparatus (or the printing bookbinding apparatus), to form an image (or to perform printing and bookbinding) for the data for printing.

Accordingly, users can confirm an electronic publication by viewing before printing and can obtain desired electronic publications surely without enhancing the performance of terminals or servers, nor increasing the process load of each component of network and the like. Further, the system enables billing fairly for the output book which was requested by the user.

In accordance with a second aspect of the invention, the method for managing printed book publishing, comprises the steps of: obtaining book contents data from a data server which stores the book contents data in accordance with a request from a terminal; converting the obtained book contents data to image data for viewing; and sending the image data for viewing to the terminal, to make the terminal display the image data for viewing.

Preferably, the method further comprises the steps of: converting the book contents data to data for printing according to a request from a terminal; and sending the data for printing to an printing bookbinding apparatus, to make the printing bookbinding apparatus print the data for printing and perform bookbinding.

The method may further comprise a step of account processing according to results of printing and bookbinding from the printing bookbinding apparatus.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 3 is a block diagram showing an embodiment of a detailed construction of a management server in the printed book publishing system;

FIGS. 4A and 4B are block diagrams showing embodiments of detailed constructions of a terminal and a printing bookbinding apparatus, in the printed book publishing system, respectively;

FIGS. 5A and 5B are flow charts showing operation procedure of a first embodiment of the printed book publishing system;

FIGS. 7A and 7B are flow charts showing operation procedure of a second embodiment of the printed book publishing system according to the invention;

DESCRIPTION OF THE PREFERRED EMBODIMENT

Hereinafter, embodiments of the present invention will be explained with reference to the drawings.

(System Construction)

Figure 1:
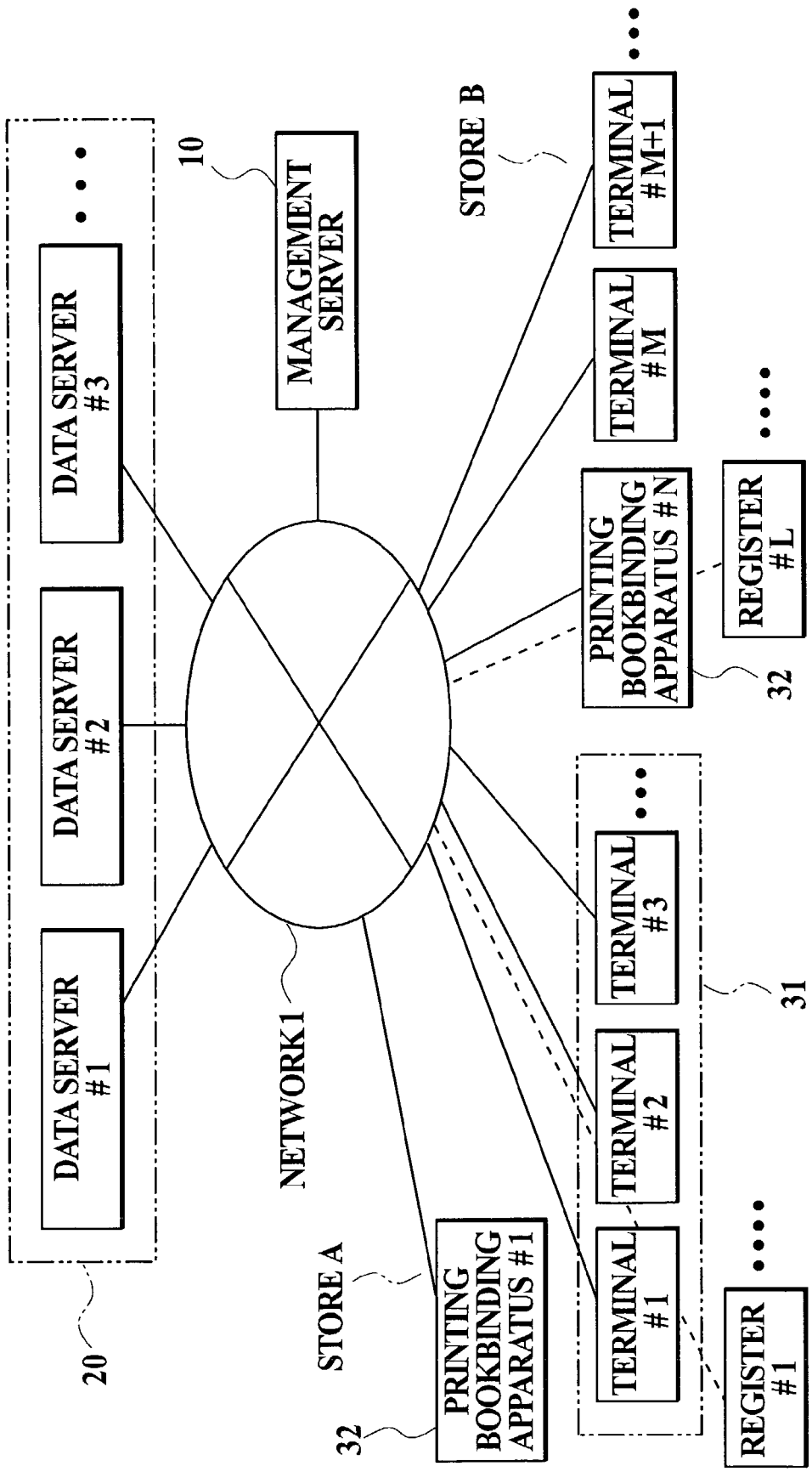
FIG. 1 is a block diagram showing an embodiment of a system construction of a printed book publishing system according to the invention.

FIG. 1 is a functional block diagram showing an embodiment of a system construction of a printed book publishing system according to the invention.

The printed book publishing system according to the embodiment comprises a management server 10; a data server section 20 which includes a data server #1, a data server #2, a data server #3, . . . ; a terminal section 31 which includes a terminal #1 to a terminal #M+1, . . . , wherein M is an integral number; a printing bookbinding apparatus section 32 which includes a printing bookbinding apparatus #1 to a printing bookbinding apparatus #N, wherein N is an integral number; and a network 1 through which sending and receiving signals between the above sections are performed. Resister section 40 includes a resister #1 to a resister #L, wherein L is an integral number, may be connected to the network 1, as occasion demands.

As the network 1, various types of networks, e.g., LAN (local area network), one including a plurality of LANs connected to each other, or the like can be used. Here, the internet is a collection of networks which are constructed by connecting LANs built in research organizations, public institutions, corporations and the like to one another always by using WAN (wide area network) technology, and is a network which developed in a large scale to cover all over the world almost spontaneously. Nodes enable communication to identify from one another by using a protocol (TCP/IP) used on the Internet.

In the internet, IP (internet protocol) addresses are used as identifiers to identify the nodes from one another, and URLs (uniform resource locator) enable designating files and the like stored in the nodes directly. Data server section 20, management server 10, terminal section 31, and printing bookbinding apparatus section 32 which are provided in the printed book publishing system are examples of such nodes.

Data server section 20 which includes a data server #1, a data server #2, a data server #3, is managed by and located at a publisher or the like. In Data server section 20, digital data for the contents of books, which hereinafter will be referred to "book contents data" simply, are stored in a disk device or the like with a large capacity. Data server section 20 sends the book contents data to management server 10 in response to a request from the management server 10 which received a request from the terminal section 31. The book contents data may be sent with a digital signature after performing conversion, compression, encryption or the like to the book contents data, as occasion demands. Book contents data is an example of the printing objects in the embodiment.

Each of data server #1, data server #2, data server #3, . . . has almost the same construction and stores different book contents data, that is, digital data for a different book from that of one another. Each of the data servers may be managed by and located at a publisher different one another.

Management server 10 is managed by and located at a management service provider who manages, for example, distribution service of book contents data. Management server 10 converts desired particular book contents data which are stored in data server section 20 including data server #1, data server #2, data server #3, . . . , to image data for viewing or data for printing which will be described later, as occasion demands, and provides the converted data to terminal section 31 and printing bookbinding apparatus section 32, respectively.

A service providing system which is an embodiment of a service side system comprises data server section 20 which includes a data server #1, a data server #2, a data server #3, . . . , and management server 10. In FIG. 1, only an embodiment of service side systems which is constituted with one management server 10 and three or more data servers #1 to #3, . . . , which are connected to network 1 is shown, the service side system may be constituted with a plurality of management servers and a plurality of data servers which are connected to network 1.

Terminal section 31 and printing bookbinding apparatus section 32 are managed by and located at stores A and B, e.g., bookstores, convenience stores or the like. A user can use each of terminals 31 freely. One or more terminals 31 and one or more printing bookbinding apparatuses 32 are provided at each store. Practically, the number of terminals 31 to be provided in a store is preferably larger than that of printing bookbinding apparatuses 32.

Each of terminals 31 sends a viewing request and a printing request, from a user to management server 10, and receives an image data for user's viewing from management server 10 to carry out displaying for the user's viewing. Each of printing bookbinding apparatuses 32 receives data for printing from management server 10 and performs printing data for printing, i.e., an image formation, and bookbinding, to output a desired book.

Each printing bookbinding apparatus 32 comprises an image forming apparatus 32A, i.e., a printer, for performing image formation (printing), and a bookbinding apparatus 32B for performing bookbinding of the resultant print of the image formation and detection of bookbinding error.

Service providing system comprising management server 10 and data server section 20 receives the results of printing and bookbinding from printing bookbinding apparatus 32 which carried out printing for the book contents data and bookbinding, and then performs counting billing data and executes bill processing on the basis of the counting result, according to the results of printing and bookbinding.

Management server 10, data server section 20 including data server #1, data server #2, data server #3, . . . , terminals 31 and printing bookbinding apparatuses 32 may carry out mutual communication which is encrypted by a public-key cryptography. That is, each of them can decrypt the digital signature of the received data by using a public key of a sending side, to identify the sending side and to prevent spoofing by other nodes, or can encrypt the sending data by using a private key to prevent illegal copying by other nodes.

Figure 2:
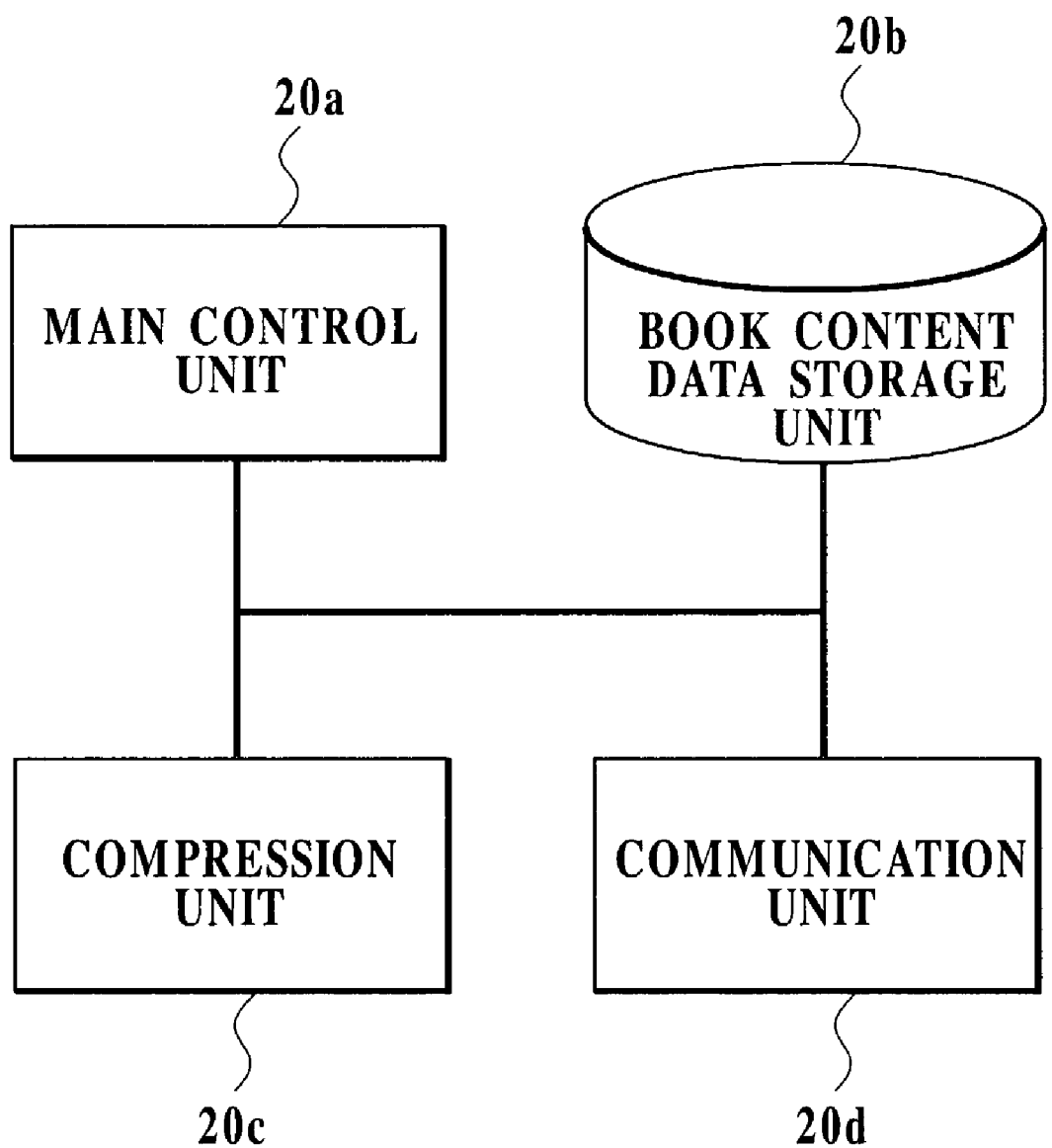
FIG. 2 is a block diagram showing an embodiment of a detailed construction of a data server in the system.

Next, each inner construction of management server 10, data server section 20, terminal section 31 and printing bookbinding apparatuses 32 will be explained with reference to FIGS. 2, 3, 4A and 4B. FIG. 2 is a block diagram showing an embodiment of a detailed construction of a data server 20 according to the embodiment. FIG. 3 is a block diagram showing a detailed construction of a management server 10 according to the embodiment. FIGS. 4A and 4B are block diagrams showing detailed constructions of a terminal 31 and a printing bookbinding apparatus 32 according to the embodiment.

In FIG. 2, each data server 20 comprises a main control unit 20a, a book content data storage unit 20b, a compression unit 20c, and a communication unit 20d, which are connected to one another by an internal bus.

Main control unit 20a comprises a CPU (central processing unit), a main memory, an auxiliary memory and the like, to control each component and the whole of data server 20 according to a program stored in the auxiliary memory.

Book content data storage unit 20b is provided with a large capacity disk device as a storage medium and stores book content data including data of contents of a book.

Main control unit 20a manages the large capacity disk device in book content data storage unit 20b by a desired file system. Main control unit 20a enables reading or writing a file having desired book content data, for example, by designating the folder and the file name. Further, main control unit 20a enables selecting a particular page from the book content data including a plurality of pages.

As the storage medium provided in book content data storage unit 20b, not only a hard disk but any storage medium, e.g., an optical disk, a magnet-optical disk or the like, may be used.

Compression unit 20c compresses the book content data in a size appropriate for communication by a data compression system which allows management server 10, terminals 31 and printing bookbinding apparatuses 32 to expand the compressed data. As the data compression system, any system may be adopted optionally. Data server 20 can perform plural systems of data compression through compression unit 20c, to communicate with various types of terminals about compressed book content data.

Communication unit 20d performs communication between data server 20 and management server 10 and communication between data server 20 and terminals 31 or printing bookbinding apparatus 32, through network 1 by using a known protocol.

Each of compression unit 20c and communication unit 20d is not limited to have only a hardware construction. It is also possible to adopt a construction using software which is executed by main control unit 20a, to process the book content data stored in book content data storage unit 20b, for communication.

FIG. 3 is a block diagram showing the construction of a management server 10. Management server 10 comprises a main control unit 11, an authentication unit 12, a print object specifying unit 13, an account processing unit 15, a data conversion unit 16, a communication unit 17, and a storage unit 18, which are connected to one another by an internal bus.

Main control unit 11 comprises a CPU, a main memory, an auxiliary memory and the like, to control each component and the whole of management server 10 according to a program stored in the auxiliary memory.

Data conversion unit 16 converts the book content data received from data server 20, to data for viewing, having an image data format with a display resolution which is not appropriate for printing because of being lower than that of data for printing but enough for users to view them as a book, in the state of an image displayed on display unit 31c of the terminal 31. Data conversion unit 16 converts the book content data stored in storage unit 18 to data for printing which enables printing, to adapt to the printing specification required by printing bookbinding apparatus 32 which will be described later and to the hardware performance of the apparatus 32. The data conversion process includes a process for converting the book content data to data for printing, by using a predetermined printing format.

Authentication unit 12 judges that one of or both the terminal 31 and the user operating the terminal is genuine when receiving a log-in request from the terminal 31. Although the terminal 31 is permitted to continue the steps of procedure which will be described later, in case of being genuine, the terminal 31 is prohibited to execute the steps, in case of being not genuine. When receiving a log-in request from the terminal 31 again, authentication unit 12 judges again whether it is genuine. As a result, if it is genuine, the terminal 31 is permitted to execute the steps of procedure.

Print object specifying unit 13 specifies the book content data stored in book content data storage unit 20b of data server 20 according to a request from the terminal 31. For example, print object specifying unit 13 specifies the relevant book content data by using a table or the like (not shown) because the terminal 31 designates the book content data by using the codes of required book. The print object specifying unit 13 further specifies printing bookbinding apparatus 32 to perform printing and bookbinding, according to a request from the terminal 31. For example, when a terminal 31 requests printing and bookbinding for data for printing, print object specifying unit 13 specifies the relevant printing bookbinding apparatus 32 which is previously registered for every terminal, and makes the printing bookbinding apparatus 32 print the data for printing and perform bookbinding. When a terminal 31 requests printing and bookbinding for data for printing and designates a printing bookbinding apparatus 32, print object specifying unit 13 authenticates the terminal 31 and the designated printing bookbinding apparatus 32 to specify the printing bookbinding apparatus and makes the printing bookbinding apparatus 32 print the data for printing and perform bookbinding.

Account processing unit 15 performs account processing on the basis of the printing and bookbinding results at the printing bookbinding apparatus 32, i.e., the result of bookbinding after printing.

Communication unit 17 performs communication between data server 20 and management server 10 and communication among management server 10, terminals 31 and printing bookbinding apparatus 32, through network 1 by using a known protocol.

Storage unit 18 stores various types of data and performs temporary storage and the like when converting the book content data to data for printing.

Each of authentication unit 12, print object specifying unit 13, account processing unit 15, data conversion unit 16, and communication unit 17 is not limited to have only a hardware construction. It is also possible to adopt a construction using a software which is executed by main control unit 11, to perform each process by using data and to send the process results to data server 20, terminal 31 or printing bookbinding apparatus 32 through communication unit 17.

FIG. 4A is a block diagram showing a detailed construction of a terminal 31 which functions as a browser. As shown in FIG. 4A, the terminal 31 comprises a main control unit 31a for controlling the components of the terminal, an input operating unit 31b for performing input operation for viewing, a display unit 31c for performing a display for viewing, and a communication unit 31d for performing communication, which are connected to one another by an internal bus.

Main control unit 31a comprises a CPU, a main memory, an auxiliary memory and the like, to control each component and the whole of the terminal 31 according to a program stored in a ROM.

Communication unit 31d performs communication between terminal 31 and data server 20 and communication between terminal 31 and management server 10, through network 1 by using a known protocol.

Input operating unit 31b has operating keys for performing various operations so that a user can perform requesting for viewing, ordering and the like.

Display unit 31c is means for displaying various types of information regarding viewing and ordering and comprises, for example, a liquid crystal display panel or the like. The various types of information include not only the information for viewing but the user's input result through input operating unit 31b, options, index data received from management server 10, charge information for book and the like.

Operating unit 31b and display unit 31c may be formed as a body, for example, by using a touch panel or the like.

FIG. 4B is a block diagram showing a detailed construction of a printing bookbinding apparatus 32. Printing bookbinding apparatus 32 comprises an image forming apparatus 32A (printer) for performing image formation (printing) for data for printing and detection of printing error, and a bookbinding apparatus 32B for performing bookbinding for the results of the image formation and detection of bookbinding error.

As shown in FIG. 4B, the image forming apparatus 32A comprises a main control unit 32a for controlling the components of the image forming apparatus, an input operating unit 32b for performing input operation for an image formation (or printing and bookbinding), a display unit 32c for performing display for the image formation (or printing and bookbinding), a communication unit 32d for performing communication, image forming unit 32e for performing image formation, and a print error detecting unit 32g for detecting print error. Bookbinding apparatus 32B comprises a bookbinding unit 32f for performing post-processing for bookbinding, and a bookbinding error detecting unit 32h for detecting bookbinding error. These units are connected to one another by an internal bus.

Main control unit 32a comprises a CPU, a main memory, an auxiliary memory and the like, to control each component and the whole of the printing bookbinding apparatus 32 according to a program stored in a ROM.

Communication unit 32d performs communication between printing bookbinding apparatus 32 and data server 20 and communication between printing bookbinding apparatus 32 and management server 10, through network 1 by using a known protocol.

Image forming unit 32e performs printing, i.e., image formation, on a material for recording one by one, according to the data for printing of the book content data. For image forming unit 32e, it is possible to use any system for forming an image on the basis of digital data, e.g., the electro-photographics system, the ink-jet system, the silver halide photography system or the like.

Print error detecting unit 32g detects print errors which are occurred by various abnormalities, e.g., a jam which is occurred during operation of image forming unit 32e such as paper jammed, to generate a detecting signal.

Bookbinding unit 32f performs well-known post-processing (bookbinding processing), e.g., gluing bookbinding for recording material, case binding of book cover, sheet cutting of edges and the like.

Bookbinding error detecting unit 32h detects bookbinding errors which are occurred by various abnormalities, e.g., a jam which is occurred during operation of bookbinding unit 32f such as paper jammed, lack of glue or the like, to generate a detecting signal. For bookbinding error detecting unit 32h, it is possible to adopt a technique for detecting abnormalities, e.g., a jam detecting technique, a detecting technique of lack of glue and the like, which are well-known and use an optical sensor, an actuator or the like.

Printing bookbinding apparatus 32 sends a notification of the results of printing and bookbinding to management server 10 in accordance with the detection signal of print error detecting unit 32g and the detection signal of bookbinding error detecting unit 32h. When any detecting signal showing any error of printing or bookbinding is generated, printing bookbinding apparatus 32 sends a notification of occurrence of an error of printing or bookbinding to management server 10. When no detecting signal is generated, printing bookbinding apparatus 32 sends a notification of success of printing or bookbinding to management server 10.

First Embodiment of the Invention:

The operation of printed book publishing system according to the first embodiment of the invention will be explained with reference to the flow chart shown in FIGS. 5A and 5B and the data flow chart shown in FIG. 6, as follows.

Figure 5A:
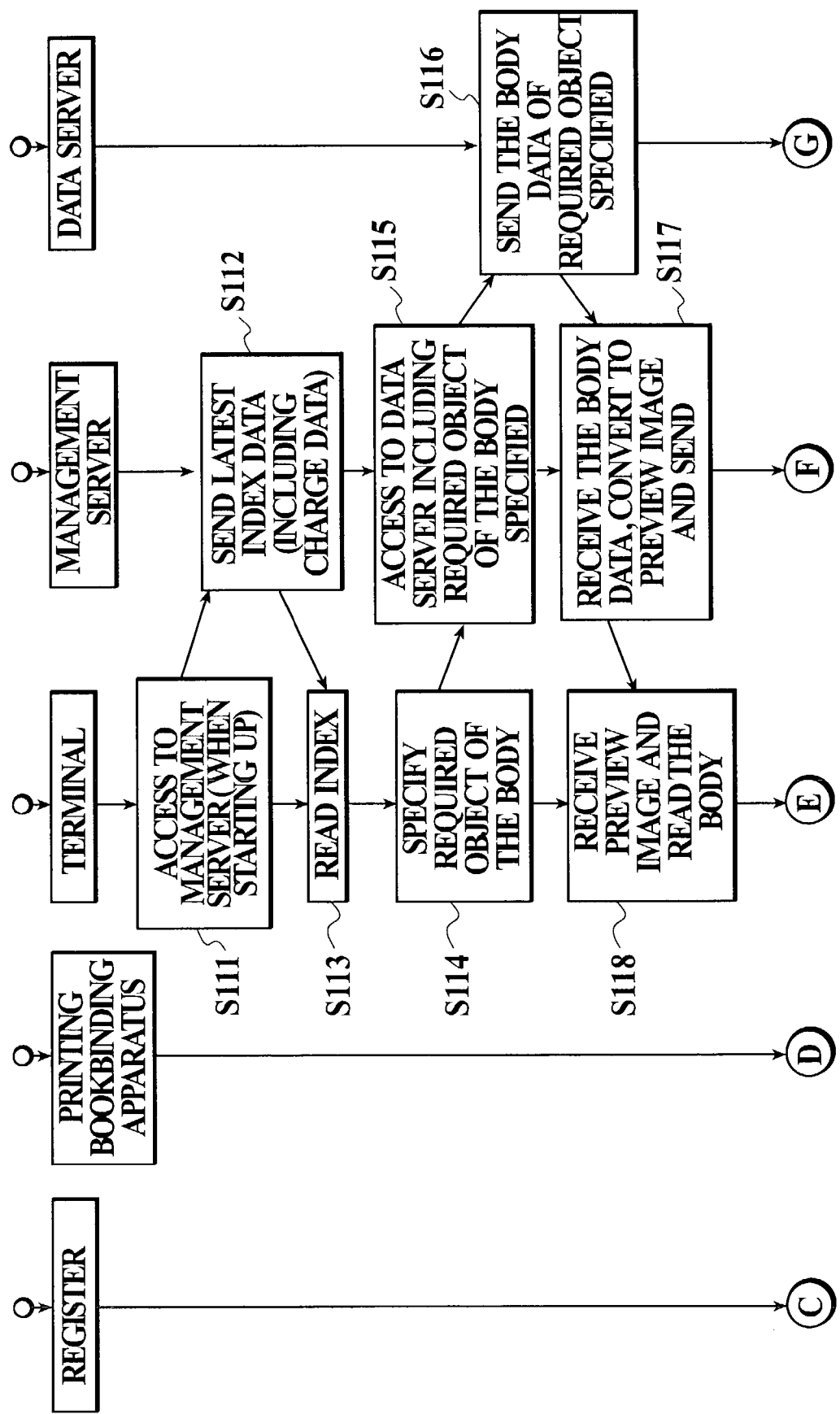

When a user which desires bookbinding for a book, i.e., printing and bookbinding of book content data, commences a procedure for printing and bookbinding of book content data by operating a terminal 31, the terminal 31 accesses to management server 10 to send a "log-in" request to management server 10 at step S111 in FIG. 5A. By the log-in, a logical communication channel is ensured between management server 10 and terminal 31.

When management server 10 receives a log-in request, management server 10 checks whether the log-in request is genuine. If the log-in request is genuine, management server 10 authenticates the terminal 31 and allows the terminal 31 to execute the following steps. Thus management server 10 judges that the log-in request of the user or the terminal, who has already been registered in management server 10 as a user of the printed book publishing system, is genuine. Thereafter, management server 10 sends the latest index data including the title of the book content data, the charge thereof and the like to the terminal 31, at step S112 in FIG. 5A.

Figure 6:
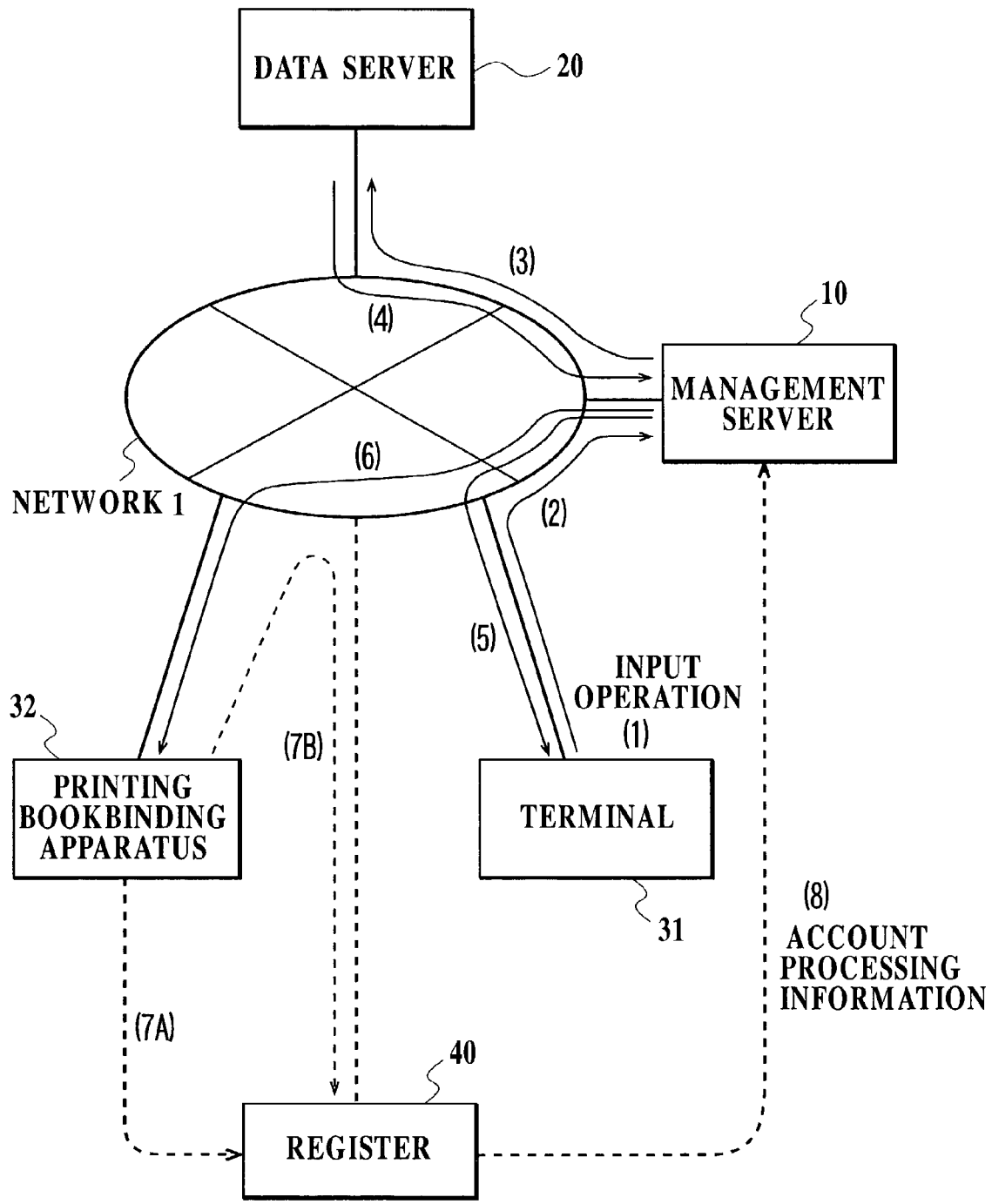
FIG. 6 is an explanation view for showing an example of the data flow in the system construction of the system.

When the terminal 31 which received the latest index data displays a preview by using a browsing function of input operating unit 31b and display unit 31c, the user reads the index on the preview, at step S113 in FIG. 5A or as shown at (1) in FIG. 6. Then, when the user requests to view the body of desired book content data, the terminal 31 specifies the user's required object of the body at step S114 in FIG. 5A, and sends the required object of the body to management server 10 as shown at (2) in FIG. 6.

Management server 10 which received the required object of the body from terminal 31 specifies the required object of the body and accesses to the data server 20 having the book content data including the body, i.e., one of data server #1, data server #2, data server #3, . . . in FIG. 1, to transmit the required object of the body, at step S115 in FIG. 5A and as shown at (3) in FIG. 6. Data server 20 received the requirement selects the corresponding body data of the book content data among data stored therein to send them to management server 10, at step S116 in FIG. 5A, and as shown at (4) in FIG. 6.

Management server 10 received the body data of the book content data from data server 20 converts the book content data to "image data for viewing" which are suitable for displaying the image for viewing, by data conversion unit 16 and transmits a preview image of the image data for viewing to the terminal 31, at step S117 in FIG. 5A, and as shown at (5) in FIG. 6. Management server 10 stores the book content data in storage unit 18 for a predetermined period of time.

In the case, management server 10 converts the book content data to image data for viewing which have an image data format with a display resolution which is not appropriate for printing because of being lower than that of data for printing but enough for users to view them as a book, for example, 100 dots/25.4 mm, in the state of an image displayed on display unit 31c of the terminal 31. In the specification, "image data for viewing" are image data having a format with such a lower display resolution. Accordingly, it is possible to prevent image data for viewing from being diverted or appropriated, e.g., from an illegal copying, to data for printing previously.

The terminal 31 which received a preview image of the image data for viewing from management server 10 displays the preview image of the image data for viewing on display unit 31c of the terminal 31, at step S118 in FIG. 5A. Accordingly, the user can confirm the body of the book by viewing it.

The user operating the terminal 31 confirms the body, that is, the body of the book of image data for viewing, displayed on display unit 31c, and orders if the user approves it, at step S119 in FIG. 5B. When the user orders, the terminal 31 sends order data to management server 10, as shown at (2) in FIG. 6.

Management server 10 received the order converts the book content data which have been stored therein when the image data for viewing were made, to data for printing and transmits them to printing bookbinding apparatus 32, at step S120 in FIG. 5B, and as shown at (6) in FIG. 6.

In the case, management server 10 converts the book content data to data for printing which have a resolution suitable for printing, which is higher than that of data for viewing and corresponds to the image formation resolution, for example, 600 dots/25.4 mm, by image forming unit 32e of printing bookbinding apparatus 32. Here, the data for printing include various types of data with a data format suitable for printing. Data for printing include data having a data format of PostScript (PS) or PDF (portable document format), which are different from that of image data for viewing.

By converting the book content data to data for printing with a high resolution, which are different from that of image data for viewing with a format of a low resolution, it is possible to prevent printing bookbinding apparatus 32 from diverting or appropriating the image data for viewing as data for printing previously. That is, it is preferable that image data for viewing has a low resolution which is enough for users to view them as a book but is not appropriate for printing.

It is also preferable that printing bookbinding apparatus 32 is allowed to receive the data for printing but is prohibited from receiving data from terminal 31, or that printing bookbinding apparatus 32 is allowed to receive only the data for printing, in order to prevent diverting or appropriating the image data for viewing to data for printing.

As described above, it is possible to prevent diverting or appropriating the image data for viewing as data for printing as they are, in printing bookbinding apparatus 32 previously, by using image data which is suitable only for viewing as the data for viewing, and by using data with PS format or PDF format which are suitable for printing as the data for printing.

In order to prohibit diverting the image data for viewing to data for printing as described above, it is preferable that the data format of the image data for viewing which are sent to terminal 31 is different from that of the data for printing which are sent to printing bookbinding apparatus 32.

In the case, data for viewing are preferable to have an image data format, e.g., JPEG, BPM, GIF, TIFF or the like, having a low resolution which is appropriate for viewing, as described above. Data for printing are preferable to have a data format, e.g., PDF, PS or the like, having a high resolution which is appropriate for printing, as described above. Data server 20 stores the book content data including at least text data, with text format, HTML (hyper text markup language) format or the like. Management server 10 converts such book content data to the above-described data for viewing or data for printing.

Printing bookbinding apparatus 32 received data for printing having PS format or the like at step S121 in FIG. 5B, performs printing at image forming unit 32e at step S122. Thereafter, Bookbinding unit 32f performs bookbinding (post-processing) at step S123, to discharge the bound book out of the apparatus. On the bound book, a predetermined mark such as a bar-code or the like which corresponds to the price of the book is attached, on the basis of account data from management server 10.

Printing is performed at image forming unit 32e and bookbinding is performed at bookbinding unit 32f. When a paper feeding failure is occurred during printing, print error detecting unit 32g generates an error signal and printing bookbinding apparatus 32 sends a signal of printing result showing a status of print failure. When no paper feeding failure is occurred, printing bookbinding apparatus 32 sends a signal of printing result showing a status of print success. When a bookbinding failure is occurred during bookbinding, bookbinding error detecting unit 32h generates an error signal and printing bookbinding apparatus 32 sends a signal of bookbinding result showing a status of bookbinding failure. When no bookbinding failure is occurred, printing bookbinding apparatus 32 sends a signal of bookbinding result showing a status of bookbinding success.

Main control unit 32a sends the bookbinding results with respect to whether any print failure was detected by print error detecting unit 32g or whether any bookbinding failure was detected by bookbinding error detecting unit 32h, to management server 10 through communication unit 32d, at step S124.

The billing system according to the present embodiment does charge to the successful results of not only printing but bookbinding, that is, complete bookbinding successful result, but does not charge to the successful result of only printing, although a general electronic publication billing system charges to the success of only printing.

In a store A and B including a bookstore, a convenience store and the like, having a printing bookbinding apparatus 32 installed, a store clerk obtains data of a bound book by reading a bar code or the like attached on the book by a register 40, as shown at (7A) in FIG. 6, or a register 40 which is connected to printing bookbinding apparatus 32 on-line obtains the data of the bound book from the printing bookbinding apparatus 32 directly, as shown at (7B) in FIG. 6. Then, the store asks for payment of the bound book to the user and the register 40 sends the sales results to management server 10 on-line or off-line, e.g., using a slip or the like, at step S125 in FIG. 5B, and as shown at (8) in FIG. 6.

Management server 10 performs comparison processing and the like, on the basis of the bookbinding results received from printing bookbinding apparatus 32 and the sales results received from register 40, and thereafter performs predetermined account processing at account processing unit 15, at step S126. For example, management server 10 performs finding the classified total of every store (all stores in case of chain stores) on the basis of the comparison processed sales results at the end of every month, and creating a bill for copyright royalty and printing and bookbinding payments amount, for the month, to every store (the generalizing store in case of chain stores).

When a user has requested a log-out through terminal 31, or when a predetermined time has elapsed after the last operation of the terminal by a user, or when a user has used a bar-code reader to read the bar-code of the bound book at register 40, terminal 31 sends a request of log-out management server 10 and then the communication channel ensured between management server 10 and terminal 31 is cut off.

Although the access and communication between terminal 31 and data server 20 through management server 10 are explained in the above-described embodiment, it is possible to provide encryption of data and attachment of digital signature for communication between nodes, e.g., data server 20 and management server 10, or between management server 10 and terminal 31, in all steps.

Second Embodiment of the Invention:

In the first embodiment of the invention, management server 10 has the latest index data of the book content data. However, data server may have the latest index data of the book content data.

The operation of printed book publishing system according to the second embodiment of the invention will be explained with reference to the flow chart shown in FIGS. 7A and 7B and the data flow chart shown in FIG. 6, as follows.

When a user which desires bookbinding for a book, i.e., printing and bookbinding of book content data, commences a procedure for requesting the latest index data of book content data by operating a terminal 31, the terminal 31 accesses to management server 10 to send a "log-in" request to management server 10 at step S211 in FIG. 7. By the log-in, a logical communication channel is ensured between management server 10 and terminal 31.

When management server 10 receives a log-in request, management server 10 checks whether the log-in request is genuine. If the log-in request is genuine, management server 10 authenticates the terminal 31 and allows the terminal 31 to execute the following steps. Thus management server 10 judges that the log-in request of the user or the terminal, who has already been registered in management server 10 as a user of the printed book publishing system, is genuine.

Management server 10 accesses data server 20 and requests the latest index data including the title of the book content data, the charge thereof and the like to data server 20, at step S212 in FIG. 7A. Data server 20 sends the requested latest index data to management server 10, at step S213. When management server 10 receives the latest index data from data server 20, management server 10 converts the latest index data to a preview image of the latest index data which are suitable for displaying the image for viewing the latest index data, and sends the preview image of the latest index data to the terminal 31, at step S214 in FIG. 7A.

When the terminal 31 which received a preview image of the latest index data of data server 20 from management server 10 displays a preview by using a browsing function of input operating unit 31b and display unit 31c, the user reads the index on the preview, at step S215 in FIG. 7A or as shown at (1) in FIG. 6. Then, when the user requests to view the body of desired book content data for bookbinding (purchasing) of a book, the terminal 31 specifies the user's required object of the body at step S216 in FIG. 7A, and sends the required object of the body to management server 10 as shown at (2) in FIG. 6.

Because the following operations are almost the same as that of the above-described first embodiment, detailed explanations will be omitted.

According to the embodiment, because the latest index data are managed in data server 20, it is possible to change the latest index data with changing the book content data together in data server 20, and therefore to facilitate management thereof easily.

Figure 8:
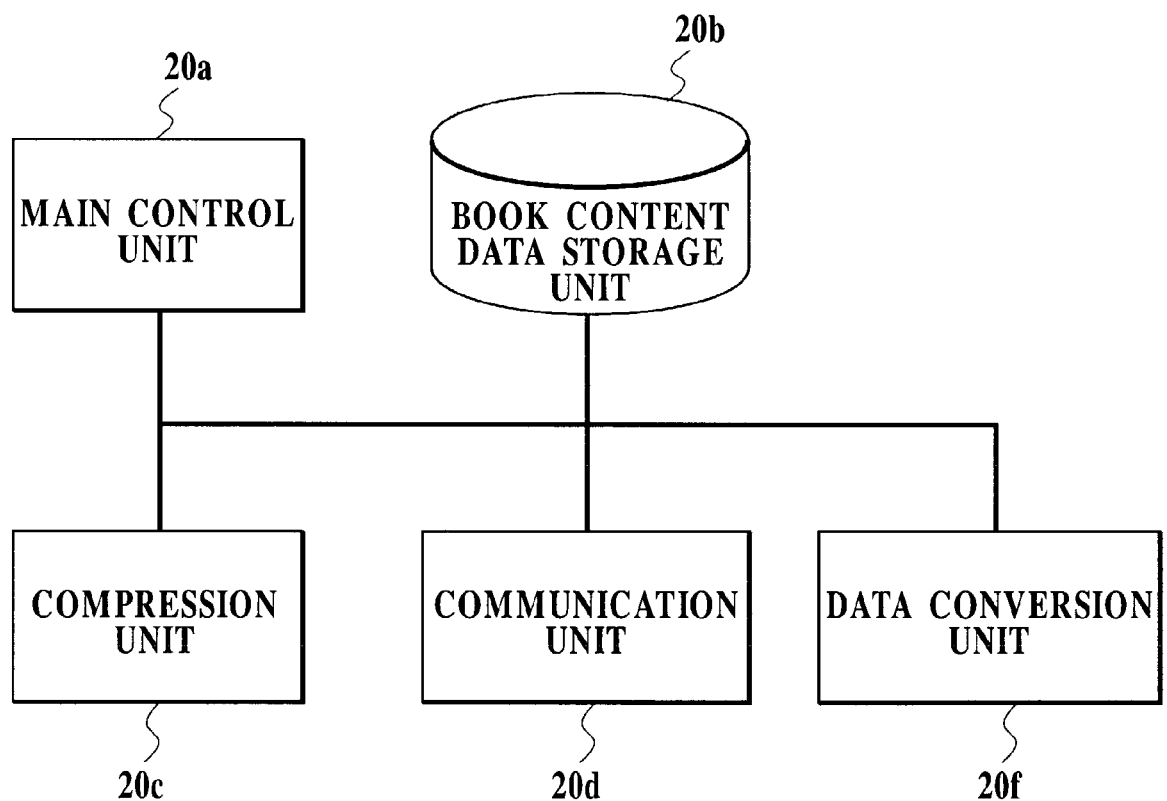
FIG. 8 is a block diagram showing another embodiment of a detailed construction of a data server in the printed book publishing system.

Third Embodiment of the Invention:

Data server 20 may further comprise a data conversion unit 20f having a capability which is almost equivalent to that of data conversion unit 16 provided in management server 10, as shown in FIG. 8. According to such a construction, above-described data conversion to be performed to the book content data can be performed in the side of data server 20. As a result, it s possible to send image data for viewing from data server 20 to terminal 31 directly, and to send data for printing from data server 20 to printing bookbinding apparatus 32 directly.

Figure 9:
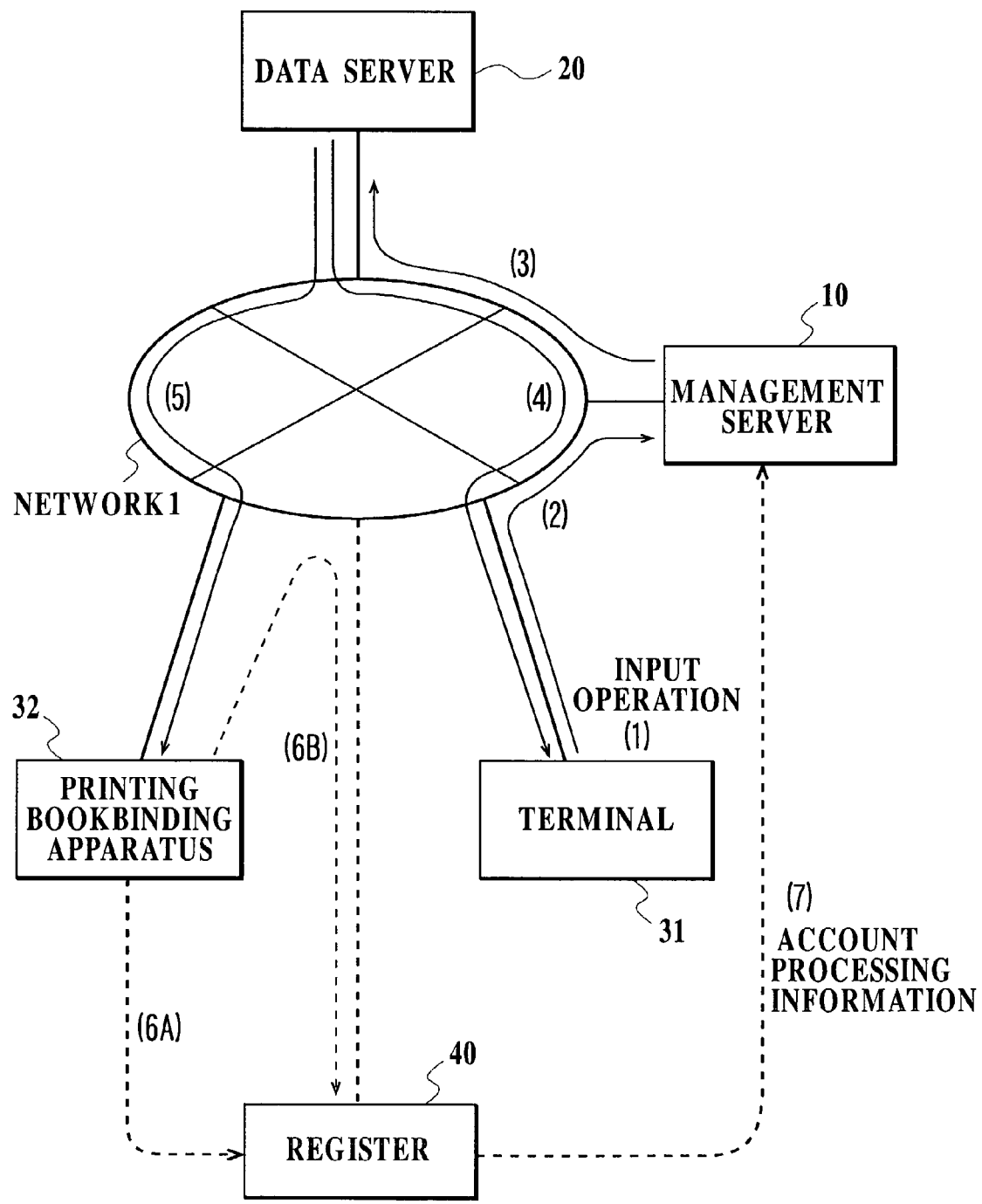
FIG. 9 is an explanation view for showing another example of the data flow in the system construction of the system.

Data conversion unit 20f which has a function of creating image data for viewing enables creating image data for viewing from the book content data and sending them to terminal 31 directly, as shown at (4) in FIG. 9.

Data conversion unit 20f which has a function of creating data for printing enables creating data for printing from the book content data and sending them to printing bookbinding apparatus 32 directly, as shown at (5) in FIG. 9. Data conversion unit 20f has a suitable tool for creating image data for viewing and data for printing from the book content data.

As described above, creating image data for viewing and sending them to terminal 31, and creating data for printing and sending them to printing bookbinding apparatus 32, enable reducing the process load of management server 10.

Another Embodiment of the Invention:

In the above-described embodiments, only a printed book publishing system comprises a management server 10, a data server section 20 which includes a data server #1, a data server #2, a data server #3, . . . , a terminal section 31, and a network 1 through which sending and receiving of signals between the sections are performed to identify from one another; is explained. However, such a network 1 is not necessarily required for the printed book publishing system of the present invention. For the present invention, any types of network construction may be adopted, as long as management server 10, data server 20 and a terminal can be communicated mutually.

For example, nodes may be connected mutually by a private line or a public line. Another construction in which management server 10 and data server section 20 exist on a LAN, and terminals are connected to the LAN by a private line, a public line; may be also used. Another construction in which management server 10 and data server section 20 exist on a LAN, and the LAN and terminals are connected with a network 1; may be also used. It is also possible to operate management server 10 and data server section 20 on a server computer.

In the embodiments, although only one data server 20 comprising main control unit 20a, book content data storage unit 20b, compression unit 20c, and communication unit 20d is explained, as shown in FIG. 2, the functions of these components may be distributed in a plurality of servers. For example, the data server 20 may be constituted with a plurality of servers by providing a hard disk in each of the servers as a book content data storage unit 20b and by mounting each hard disk to a file system of one of the servers.

In the above-described embodiments, although only an example in which one management server 10 comprising a main control unit 11, an authentication unit 12, a print object specifying unit 13, an account processing unit 15, a data conversion unit 16, and a communication unit 17 is explained, as shown in FIG. 3, these units may be distributed in a plurality of servers.

The system may comprise a plurality of management servers 10 each of which comprises a main control unit 11, an authentication unit 12, a print object specifying unit 13, an account processing unit 15, a data conversion unit 16, and a communication unit 17. In case of the system comprising a plurality of management servers, the system may have a construction in which a user can select any one of the management servers 10 optionally by operating terminal 31, or allocation for the management servers 10 are previously determined.

The present invention has the following advantageous effects.

According to the above-described printed book publishing system, before printing and bookbinding for the book contents data are carried out, the management server makes a data server send the book contents data to the management server in accordance with a request from the terminal, and converts the received book contents data to image data for viewing, and send the converted image data for viewing to the terminal, to make the terminal display the image data for viewing.

Accordingly, a user can confirm an electronic publication by viewing before printing and therefore can obtain the desired correct publication surely.

In the above-described printed book publishing system, in order to make a predetermined number of books, the management server converts the book contents data to data for printing which are in place in a predetermined paper size, in accordance with a request from the terminal, and then sends the data for printing to an image forming apparatus (or a printing bookbinding apparatus) which is provided in the terminal side, to form an image (or to perform printing and bookbinding) for the data for printing.

Accordingly, users can obtain desired electronic publications securely without enhancing the performance of terminals or servers, nor increasing the process load of each component of network and the like.

In the above-described printed book publishing system, the management server converts the book contents data to data for printing which are in place in a predetermined paper size, and then makes the image forming apparatus form an image. When making a predetermined number of books, the management server makes the data server send the book contents data in accordance with a viewing request from the terminal, and converts the received book contents data to image data for viewing, and send the converted image data for viewing to the terminal, to make the terminal display the image data for viewing. According to a printing request from the terminal, the management server converts the book contents data to data for printing, and sends the converted data for printing to the image forming apparatus, to form an image for the data for printing.

Accordingly, users can confirm an electronic publication by viewing before printing and can obtain desired electronic publications surely without enhancing the performance of terminals or servers, nor increasing the process load of each component of network and the like. Further, the system enables billing fairly for the output book which was requested by the user.

The entire disclosure of Japanese Patent Application No. Tokugan 2001-181185 filed on Jun. 15, 2001 including specification, claims, drawings and summary are incorporated herein by reference in its entirety.

What is claimed is:

1. A printed bock publishing system in which book contents data recording book contents is converted into data for printing so as to fit the book contents data within a predetermined page size, image formation is performed and predetermined number of books is produced, comprising:

a terminal having an operation member and a display member;

a data sewer for staring predetermined number of book contents data and sending any book contents data according to a request;

a management server including a storage section for retrieving from the data server the book contents data requested by the terminal and for storing the book contents data, a data conversion section for converting the book contents data into image data for viewing and the data for printing, according to the request from the terminal;

a printing bookbinding apparatus comprising:

an image formation apparatus for forming an image based on the obtained data for printing:

a bookbinding apparatus for performing bookbinding;

a print error detecting unit for detecting a print error; and a bookbinding error detecting unit for detecting a bookbinding error;

wherein the data conversion section converts the book contents data into the data for viewing to send the converted data for viewing to the terminal;

or the data conversion section converts the book contents data into the data for printing so as to fit the book contents data within the predetermined papa size to send the converted data for printing to the image formation apparatus;

the terminal displays the obtained image data for viewing; or the image formation apparatus forms the image based on the obtained data for printing; and the data conversion section converts the book contents data into the image data for viewing to be sent to the terminal and the data for printing to be sent to the image formation apparatus so as to have image data format with a display resolution which is not appropriate for printing because being lower in resolution than said data for printing; and wherein, in the case of printing a book, a fee is charged only when the print error detecting unit detects a print success as well as the bookbinding error detecting unit detects a bookbinding success.

2. The system of claim 1, wherein the book contents data is data including at least text data, the image data far viewing is image data in a format capable of being used for displaying the image without converting a data format in the terminal, and the data for printing is data in a format capable of being used for forming the image at the image formation apparatus.

3. The system of claim 2, wherein the data for printing has a data format of PDF or PostScript.

4. The system of claim 1, wherein the image data for viewing is in an image data format having rougher density than that of the data for printing.

5. The system of claim 1, wherein the terminal and the image formation apparatus are installed in a store and perform an accounting process according to an output of a bound book.

6. The system of claim 1, wherein the management server sends index data to the terminal according to the request from the terminal, and the terminal displays the index data.

7. The system of claim 1, wherein the management server comprises an authentication section for authenticating the terminal.

* * * * *